United States Patent [19]

Jones

[11] 4,179,236

[45] Dec. 18, 1979

[54] BOARD SEPARATOR

[75] Inventor: Aaron U. Jones, Eugene, Oreg.

[73] Assignee: Seneca Sawmill Company, Inc., Eugene, Oreg.

[21] Appl. No.: 886,879

[22] Filed: Mar. 15, 1978

[51] Int. Cl.² .............................................. B65G 59/08
[52] U.S. Cl. .................................. 414/117; 144/245 R; 198/443; 198/489
[58] Field of Search .......................... 214/8.5 R, 8.5 A; 198/443, 489, 490; 144/242 R, 245 R, 245 A

[56] References Cited

U.S. PATENT DOCUMENTS

| | | | |
|---|---|---|---|
| 1,798,834 | 3/1931 | Campen | 144/245 R |
| 1,826,379 | 10/1931 | Birkmeyer | 198/406 |
| 2,675,929 | 4/1954 | Youngfelt | 214/6 M |
| 2,786,565 | 3/1957 | Eckart | 198/406 |
| 2,987,088 | 6/1951 | Dennison | 144/326 R |

Primary Examiner—Trygve M. Blix
Assistant Examiner—George F. Abraham
Attorney, Agent, or Firm—Klarquist, Sparkman, Campbell, Leigh, Hall & Whinston

[57] ABSTRACT

A board separator apparatus for separating boards from groups of boards is described. The separator apparatus includes an input conveyor for feeding the groups of boards in a vertical position longitudinally into a transfer box, which is pivoted to transfer the boards onto an elevator member in the separation means. The elevator member lowers each group of boards into a separation position where they are held by a pressure plate against separator arms. The separator arms are moved outward into three different separator positions, thereby selectively causing three boards in a group to be moved one at a time off of the elevator into a separated condition. The separated boards slide down a ramp from the elevator member onto an output conveyor which transports the boards laterally away from the separator in a horizontal position. The boards are fed onto the output conveyor with the wane side of the boards facing up when such boards are cants cut from the side of a round log. These cants are thereby separated and oriented in position to be fed into a resaw section which detects and removes the wane portions of such cants.

12 Claims, 4 Drawing Figures

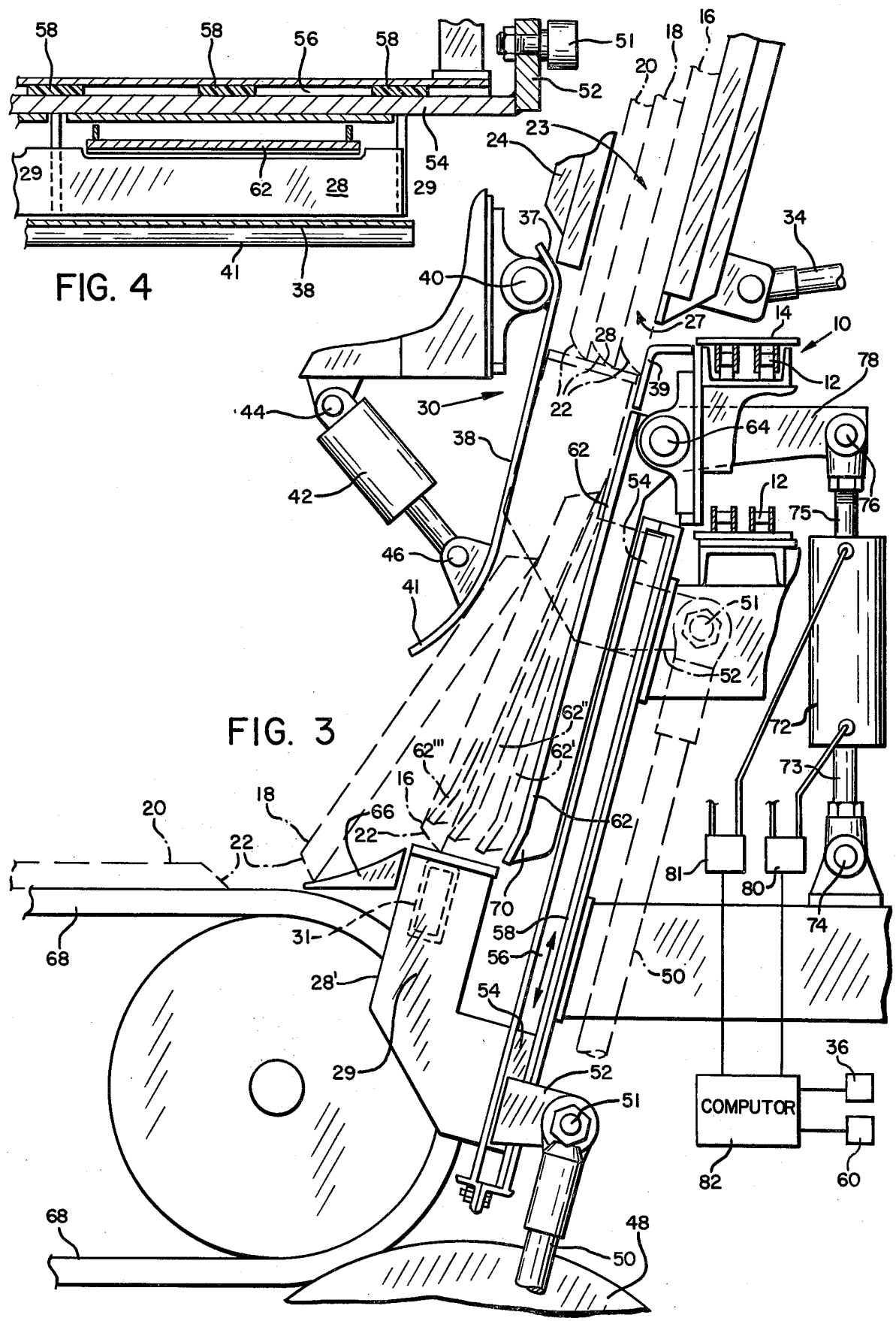

BOARD SEPARATOR

BACKGROUND OF THE INVENTION

The subject matter of the present invention relates generally to board separator apparatus for separating individual boards from groups of boards. In addition, the board separator of the invention is useful in orienting the boards with a predetermined side of the boards facing upward for further processsing of the boards. The boards may be cants, which are sawed from a round log so that they have rounded edge portions or wanes on one side of the board. The boards can be oriented with the wane side facing up to enable detection of the wanes with a light scanning means, and removal of the wanes in a resaw section of the sawmill.

Previously, board separator apparatus have been employed for feeding boards individually from a stack to a saw or other woodworking means, as shown in U.S. Pat. No. 1,798,834 of E. D. Campen and U.S. Pat. No. 2,786,565 of R. H. Eckart. However, these separators do not employ an elevator means for lowering the boards from an input conveyor and separator arms for selectively moving the boards one at a time off of the elevator means onto an output conveyor to separate the boards from the group of boards placed on such elevator means in the manner of the present invention. In addition, none of these references discloses the use of a transfer box for transferring a group of boards from the input conveyor to the elevator means in the manner of the present invention. Also, in both of these patents the separated board is transported in a vertical position, not a horizontal position, by the output conveyor and the boards are not oriented with a predetermined side of the board facing up in the manner of the present invention.

Of course it is old to provide a transfer means for transferring articles positioned vertically on an input conveyor into a horizontal position on an output conveyor, as shown by U.S. Pat. No. 1,826,379 of P. J. Birkmeyer et al which employs such a transfer means for telegrams, letters and the like. In addition, it is old to separate boards and transmit them horizontally over a conveyor means, as shown in U.S. Pat. No. 2,675,929 of T. T. Youngfelt and U.S. Pat. No. 2,987,088 of L. B. Dennison. However, none of these patents shows a board separator apparatus like that of the present invention employing elevator means, separator arms and a transfer box.

The board separator apparatus of the present invention has several advantages. It is relatively simple in construction. It operates quickly and accurately to separate the boards, to transfer the boards from one conveyor to another, and to orient the separated boards on the output conveyor with a predetermined side of such boards facing up. In addition, the board separator apparatus of the present invention operates in a trouble-free manner and is not subject to jamming.

SUMMARY OF THE INVENTION

It is therefore one object of the present invention to provide an improved board separator apparatus which separates individual boards from a group of boards.

An additional object of the invention is to provide such a board separator apparatus which transfers the boards from a group of boards in a vertical position on an input conveyor to separated boards in a horizontal position on an output conveyor.

Another object of the invention is to provide such a board separator apparatus of simple construction including an elevator means for lowering the group of boards from an input position to a separation position where separator arms move the boards off of the elevator means one at a time to separate such boards from the group.

A further object of the invention is to provide such a board separator apparatus including a pivoted transfer box for transferring a group of boards from an input conveyor to the top of such elevator means in a simple, fast and trouble-free manner.

A still further object of the invention is to provide such a board separator apparatus with a pressure plate for holding the boards on the elevator means, but allowing such boards to be removed from the elevator means by the separator arms.

Still another object of the invention is to provide such a board separator apparatus which orients the boards so that they are positioned horizontally on an output conveyor with a predetermined side of such boards facing up.

DRAWINGS

Other objects and advantages of the present invention will be apparent from the following detailed description of a preferred embodiment thereof and from the attached drawings, of which:

FIG. 3 is an enlarged view of a portion of FIG. 1 showing parts of the apparatus in different positions; and FIG. 4 is a section view taken along line 4—4 of FIG. 1.

DESCRIPTION OF PREFERRED EMBODIMENT

Figure 1:
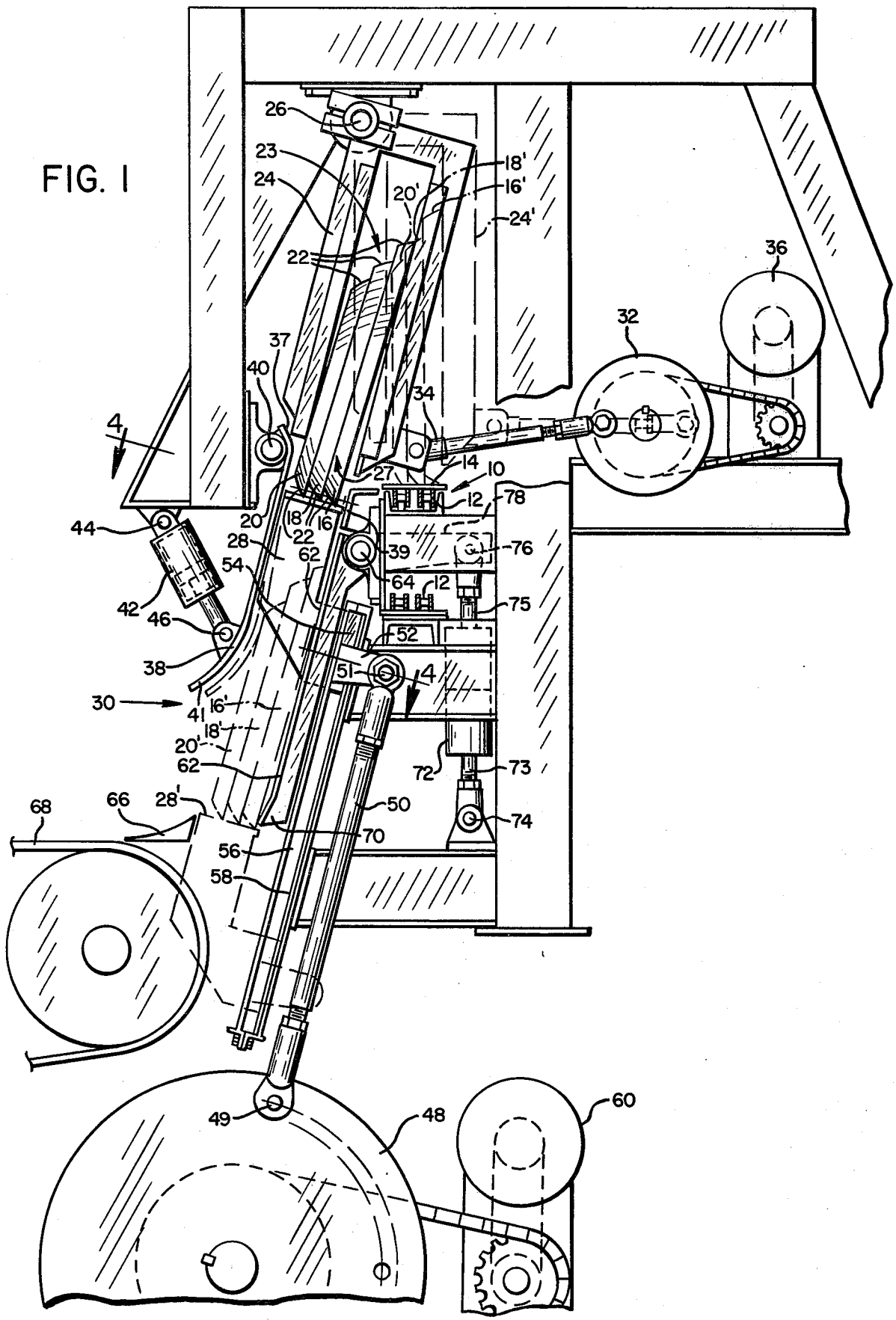
FIG. 1 is a side elevation view of one embodiment of the board separator apparatus of the present invention.

As shown in FIGS. 1 to 4, a preferred embodiment of the board separator apparatus of the present invention includes an input conveyor 10 which may consist of an endless conveyor chain 12 having stop members 14 attached at spaced positions on the chain. The stop members engage the ends of groups of boards transported in a vertical position on such input conveyor for moving the groups of boards on the upper reach of such conveyor chain. Each group of boards may consist of three boards or "cants" 16, 18 and 20 which are cut from a round log so that they are provided with rounded edges or wanes 22 at their opposite sides extending longitudinally along such boards. Each group of boards is transmitted by the input conveyor 10 into the open end 23 of a transfer box 24. The transfer box is pivotally mounted on a shaft 26 at the upper end of such box for movement between a load position 24' shown in phantom lines above the input conveyor and an unload position 24 shown in solid lines. The transfer box has a bottom opening 27 so that the boards slide out of the transfer box onto the top of an elevator 28 at the input of a separator means 30 in the unload position of such box.

Figure 2:
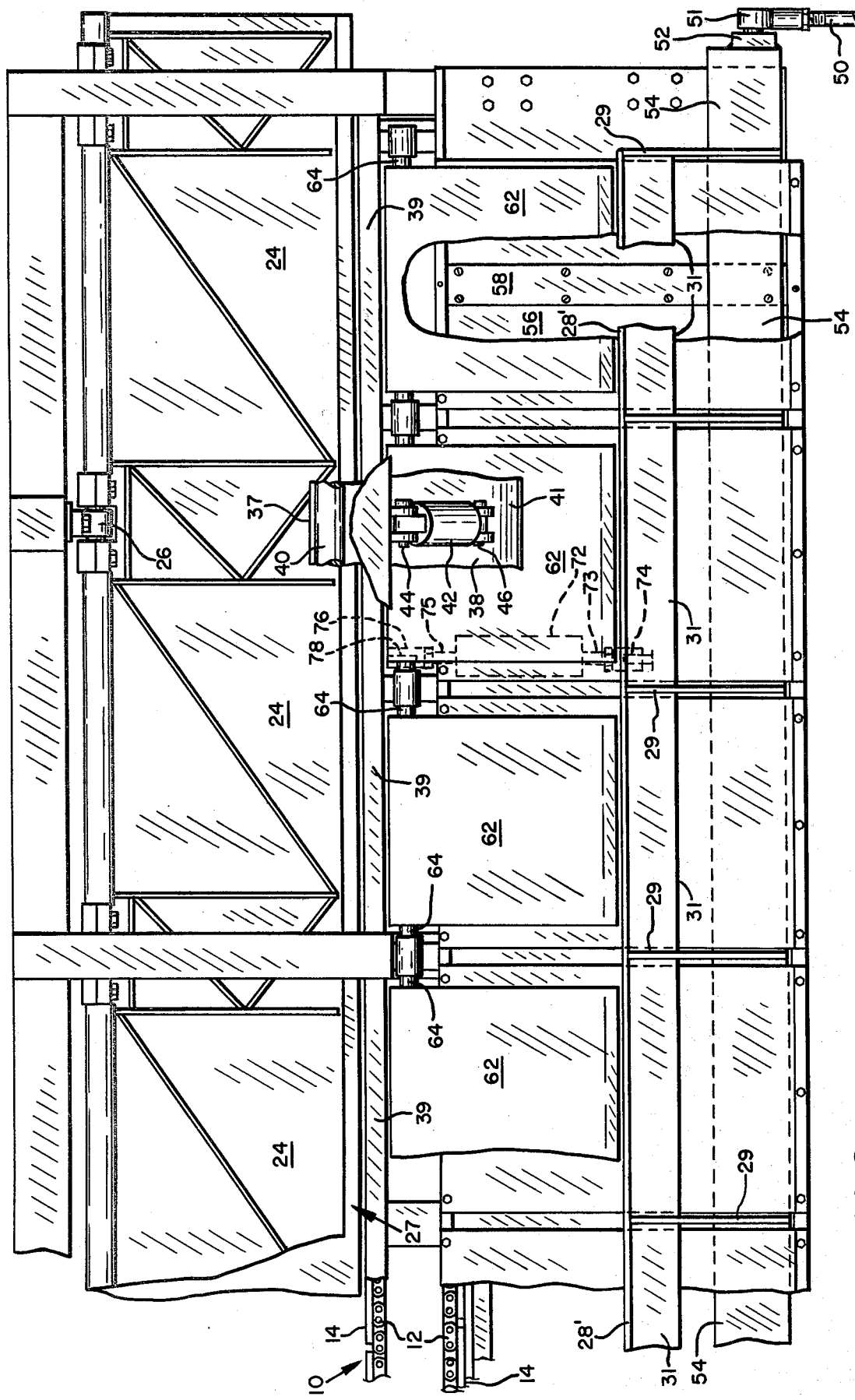
FIG. 2 is a partial front elevation view of the apparatus of FIG. 1 with parts broken away for clarity.

The transfer box is pivoted automatically between the load position and unload position. For this purpose, the transfer box is connected to a rotating crank member 32 by a connecting link 34 which is pivotally attached at its opposite ends to such crank and such transfer box. The crank is rotated intermittently in 180° steps by an electric motor 36 whose output shaft is coupled to the crank shaft by a suitable coupling such as a drive chain. Thus, rotation of the crank 32 by motor 36 causes the transfer box 24 to pivot about shaft 26 between the load position 24' and the unload position 24 shown in FIG. 1. As a result, groups of boards are transferred from the input conveyor 10 to the top of the elevator 28 in the separation means 30. It should be noted that channel members (not shown) are employed on opposite sides of the upper reach of the input conveyor 10 in order to support the groups of boards in a vertical position with their side edges in engagement with the conveyor until such boards enter the transfer box. Also, the top of the elevator 28 in its raised position is spaced below the top of the conveyor 10 so that the boards do not drag across the elevator when they are quickly transferred from such conveyor to such elevator by the transfer box. The elevator includes vertical support plates 29 and horizontal support beams 31 spaced laterally beneath the top of such elevator, as shown in FIG. 2.

The separator means 30 includes a pressure plate 38 which is pivotally mounted at its upper end on shaft 40. The pressure plate flares outwardly at its upper end 37 where it is attached to pivot shaft 40. This upper end 37 cooperates with an entrance plate 39 of an inverted L-shaped cross section to receive the boards into the input of the separator means. The pressure plate 38 also flares outwardly at its lower end 41 even more than at its upper end 37 for discharge of the boards. The pressure plate is urged into contact with the boards on top of the elevator 28 by a cushioning air cylinder 42, pivotally attached at its upper end by a pivot 44 to the frame of the apparatus and has its piston rod pivotally attached at its lower end by pivot 46 to the pressure plate. The cylinder 42 acts like a dash-pot to hold the pressure plate in contact with the boards on the elevator after such elevator moves along an inclined path from a raised input position 28 shown in solid lines to a lowered separation position 28' shown in phantom lines in FIG. 1. It should be noted that the cushioning cylinder 42 may be eliminated in some cases and the pressure plate 38 urged against the boards by gravity due to the weight of such pressure plate.

The elevator member is moved from the input position 28 to the separation position 28' by a rotating crank 48 connected at pivot 49 to one end of a coupling rod 50, whose other end is connected at pivot 51 to a projection 52 extending from the side of the elevator. The projection 52 is secured to a guide plate portion 54 of the elevator which slides along an inclined track channel 56. Thus, the guide member 54 slides up and down in track channel 56 to guide the movement of the elevator along the inclined path between the raised position 28 and the lowered position 28'. A bearing surface of low friction material 58, such as a strip of polyethylene or other suitable plastic material, may be provided on the lower surface of the inclined track. The crank 48 is coupled to an electrical motor 60 for intermittent rotation of the crank in 180° steps which raises and lowers the elevator 28 in synchronism with the pivotal movement of the transfer box 24. As a result, the elevator is moved into the raised position 28 when the transfer box is pivoted into the unload position 24, and they stay in such positions until the boards are unloaded onto the elevator, at which time the elevator is moved to the lowered position 28'. The transfer box is then moved to the load position 24'. The elevator is moved downward quickly by motor 60 at a speed of about 80% of the velocity of gravity, so that there is little load on the elevator until it reaches its lowered position 28' where it stays until the boards are removed.

The separator means 30 includes a plurality of separator arms 62 which are mounted on a pivot shaft means 64 and are spaced longitudinally along such pivot shaft. The separator arms engage the inner board 16 of each group of boards as such boards are pressed by the pressure plate 38 against such arms in the lowered position 28' of the elevator member. The separator arms are pivoted outward about the axis of shaft 64 from the rest position 62 shown in solid lines into three discharge positions 62', 62", and 62"' shown in phantom lines, to cause the three boards of each group to be moved off the top of the elevator member 28 one at a time so that they slide down skid members 66 and fall onto the upper reach of an output conveyor 68. In the first separation position 62', the outer board 20 is moved off the edge of the elevator member 28 and slides downward onto the output conveyor 68. In the second separation position 62", the middle board 22 is moved off the top of the elevator 28 and slides down onto the output conveyor. In the third separation position 62"', the inner board 16 is moved off the top of the elevator and slides down onto the output conveyor. The lower ends of the boards are moved outward first as a result of the outwardly flared lower end 41 of the pressure plate 38 and the outwardly pointed lower end 70 of the separator arms 62.

The separator arms 62 are pivoted by a pair of double-ended air cylinders 72 having their lower piston rod 73 fixed to the frame by pivot connections 74 and having its upper piston rod 75 pivotally connected at 76 to a link 78 which is welded to the pivot shaft 64 of the separator arms. The two air cylinders 72 are both two stroke cylinders and together they deliver three strokes of approximately ¾ inch length each to move the separator arms 62 into the three separator positions 62', 62" and 62"' and a forth stroke to return the separator arms from position 62"' to rest position 62. The two actuating cylinders 72 and coupling links 78 are provided in spaced positions along the pivot shaft means 64 near the opposite ends of such shaft. The actuating cylinders 72 are operated by valve means 80 and 81 controlled by an electronic computer 82, which also controls the intermittent operation of the transfer box motor 36 and the elevator motor 60.

It will be obvious to those having ordinary skill in the art that many changes may be made in the preferred embodiment of the present invention without departing from the spirit of the invention. Therefore, the scope of the present invention should only be determined by the following claims.

I claim:
1. Board separating apparatus, comprising:
input conveyor means for conveying boards in groups with each group including a plurality of boards;
separator means for separating the boards of each group;
transfer means for transferring the groups of boards from said input conveyor means to an input position at the input of the separator means;
said separator means including elevator means for lowering the groups of boards from said input position to a separation position within said separator means;

separator arms aligned with the group of boards in said separation position; and control means for moving the separator arms to cause them to move the boards in each group off the elevator means one at a time in said separation position to separate the boards from each other and cause them to be discharged at different times from the outlet of said separator means.

2. Apparatus in accordance with claim 1 in which the transfer means is a rectangular box having a board inlet opening at one end for receiving a group of boards from the conveyor means in a load position of the box, and a board outlet opening at the bottom of said box for discharging the groups of boards onto the elevator means in an unload position of the box.

3. Apparatus in accordance with claim 2 in which the box is pivotally mounted at the top of said box and is pivoted by a motor driven crank means between the load position and the unload position.

4. Apparatus in accordance with claim 1 in which the separator means includes a pressure plate for holding the boards on the elevator means but having means for enabling the boards to be removed from the elevator by the separator arms.

5. Apparatus in accordance with claim 4 in which the pressure plate is pivotally mounted on a support shaft and urged against the top board of the group.

6. Apparatus in accordance with claim 1 in which the elevator means moves along an inclined path and backing means extends along said path for supporting said boards.

7. Apparatus in accordance with claim 6 in which the backing means is provided by the separator arms.

8. Apparatus in accordance with claim 6 in which the elevator means is moved up and down along the inclined path by a motor driven crank means and includes a guide means which slides along an inclined track means for guiding the movement of said elevator means.

9. Apparatus in accordance with claim 1 in which the separator arms are pivotally mounted on a common support shaft and the control means causes said separator arms to pivot about said support shaft to move the boards off the elevator means.

10. Apparatus in accordance with claim 1 in which the separator arms are pivotally mounted at their top ends and the control means includes cylinder means for pivoting said arms from a rest position through a plurality of discharge positions corresponding to the number of boards in the group, said arms moving intermittently between said discharge positions.

11. Apparatus in accordance with claim 1 in which the boards in each group are cants cut from a log and are discharged from the separator means onto an output conveyor in a horizontal position with the wane side of the boards facing up.

12. Apparatus in accordance with claim 11 in which the groups of boards are transported longitudinally by the input conveyor means into the transfer box in a vertical position with one longitudinal edge of each board in contact with the input conveyor means and said boards are transported laterally by the output conveyor means away from the separator means in the horizontal position with one side of each board in contact with said output conveyor means.

* * * * *